US012604349B2

(12) United States Patent
Wang et al.

(10) Patent No.: US 12,604,349 B2
(45) Date of Patent: Apr. 14, 2026

(54) SYSTEM INFORMATION DELIVERY FOR LAYER-2-BASED SIDELINK RELAY

(71) Applicant: MediaTek Singapore Pte. Ltd., Singapore (SG)

(72) Inventors: Xuelong Wang, Beijing (CN); Nathan Edward Tenny, San Jose, CA (US); Guan-Yu Lin, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 839 days.

(21) Appl. No.: 17/810,140

(22) Filed: Jun. 30, 2022

(65) Prior Publication Data

US 2022/0338283 A1    Oct. 20, 2022

Related U.S. Application Data

(63) Continuation of application No. PCT/CN2020/141410, filed on Dec. 30, 2020, which
(Continued)

(51) Int. Cl.
*H04W 76/14*        (2018.01)
*H04W 76/20*        (2018.01)
(Continued)

(52) U.S. Cl.
CPC ........... *H04W 76/14* (2018.02); *H04W 76/20* (2018.02); *H04W 88/04* (2013.01); *H04W 92/18* (2013.01)

(58) Field of Classification Search
CPC ...... H04W 76/14; H04W 76/20; H04W 92/18
See application file for complete search history.

(56) References Cited

U.S. PATENT DOCUMENTS 10,531,365 B2 *    1/2020    Kaur ...................... H04W 48/10
11,140,744 B2 *    10/2021    Lee ........................ G07C 5/008
(Continued)

FOREIGN PATENT DOCUMENTS

JP        WO2018203443        5/2017
WO        WO2018194390 A1    4/2017
WO        WO-2017155291 A2 *    9/2017    ............ H04W 48/10

OTHER PUBLICATIONS

International Search Report and Written Opinion of International Search Authority for PCT/CN2020/141410 dated Mar. 29, 2021 (10 pages).
(Continued)

*Primary Examiner* — Parth Patel
(74) *Attorney, Agent, or Firm* — Helen Mao; Imperium Patent Works

(57)        ABSTRACT

Apparatus and methods are provided for system information delivery through a sidelink relay in a NR network. In one novel aspect, on-demand system information is delivered to a remote UE through a PC5-RRC message. In one embodiment, the relay UE aggregates SI requests from one or more UEs in the SI Request destined to the gNB. In one embodiment, the PC5-RRC message is a PC5 unicast message based on an Uu-RRC broadcast SI Update message from the gNB. In another embodiment, the PC5-RRC message is a PC5 broadcast message, which includes a version number in a MAC header indicating an SI update broadcast. In yet another embodiment, the PC5-RRC message is a PC5 groupcast message. In one embodiment, the remote UE is in an RRC-IDLE state, and wherein the UE sends the SI Request message destined to the gNB through the sidelink in a PC5-RRC SI Request message.

18 Claims, 6 Drawing Sheets

Related U.S. Application Data is a continuation of application No. PCT/CN2019/129792, filed on Dec. 30, 2019.

(51) Int. Cl.
*H04W 88/04* (2009.01)
*H04W 92/18* (2009.01)

(56) References Cited

U.S. PATENT DOCUMENTS

| | | | | |
|---|---|---|---|---|
| 2016/0344782 A1* | 11/2016 | Cheng | .................... | H04W 4/70 |
| 2018/0092027 A1* | 3/2018 | Sheng | ................... | H04W 48/08 |
| 2018/0213577 A1* | 7/2018 | Burbidge | ............. | H04W 76/10 |
| 2018/0295671 A1* | 10/2018 | Kim | ...................... | H04W 76/00 |
| 2018/0302754 A1* | 10/2018 | Kim | ...................... | H04W 88/04 |
| 2019/0268964 A1* | 8/2019 | Lee | ....................... | H04W 76/14 |
| 2020/0008173 A1* | 1/2020 | Kim | ...................... | H04W 76/10 |
| 2020/0091991 A1* | 3/2020 | Fujishiro | .............. | H04W 68/02 |
| 2020/0092685 A1* | 3/2020 | Fehrenbach | .......... | H04W 72/23 |
| 2020/0314960 A1* | 10/2020 | Basu Mallick | ....... | H04W 88/06 |
| 2020/0351975 A1* | 11/2020 | Tseng | ................... | H04W 76/19 |
| 2020/0403737 A1* | 12/2020 | Yeo | ..................... | H04W 52/325 |
| 2021/0045093 A1* | 2/2021 | Rao | ...................... | H04W 76/14 |
| 2021/0105852 A1* | 4/2021 | Shih | ...................... | H04W 76/10 |
| 2021/0120476 A1* | 4/2021 | Lee | ....................... | H04W 48/10 |
| 2021/0160956 A1* | 5/2021 | Wang | ................... | H04W 40/34 |
| 2021/0195503 A1* | 6/2021 | Tang | .................... | H04W 72/23 |
| 2021/0321363 A1* | 10/2021 | Belleschi | ............. | H04W 72/02 |
| 2022/0078746 A1* | 3/2022 | Lee | ...................... | H04W 64/003 |
| 2022/0201538 A1* | 6/2022 | Lee | ................... | H04W 28/0268 |
| 2022/0303821 A1* | 9/2022 | Kang | ................ | H04W 28/0278 |
| 2022/0330261 A1* | 10/2022 | Yeo | ..................... | H04W 72/543 |
| 2022/0338283 A1* | 10/2022 | Wang | .................... | H04W 76/14 |
| 2022/0377649 A1* | 11/2022 | Choi | .................... | H04W 48/12 |
| 2022/0386081 A1* | 12/2022 | Chen | ...................... | H04W 4/40 |
| 2022/0417976 A1* | 12/2022 | Park | .................... | H04L 5/0053 |
| 2023/0015755 A1* | 1/2023 | Wang | ................... | H04W 72/20 |
| 2023/0023639 A1* | 1/2023 | Shi | ........................ | H04W 76/12 |

OTHER PUBLICATIONS

MediaTek In. RRC "State for Relaying" 3GPP TSG-RAN WG2 meeting #111 electronic R2-2006571 Aug. 28, 2020 (Aug. 28, 2020) Section 3-4.

Ericsson RAN2 "Impacts introduced by Layer 2 SL relay" 3GPP TSTG-RAN WG2 #112e R2-2009230 Nov. 13, 2020 (Nov. 13, 2020) Section 2.1-2.5.

3GPP 3GPP Ts 36.331 V15.7.0; Technical Specification Group Radio Access Network; Evolved Universal Terrestrial Radio Access (E-UTRA) ; Radio resource control (RRC) ; Protocol specification (Release 15) Sep. 30, 2019 (Sep. 30, 2019) Section 5.10.2-5.10.11.

OPPO New SID: Study on NR sidelink relay 3GPP TSG RAN Meeting #86 RP-193253 Dec. 12, 2019 (Dec. 12, 2019) Section 2-5.

European Intellectual Property Office Action 202080091285.8 , dated Oct. 28, 2023 (9 pages).

* cited by examiner

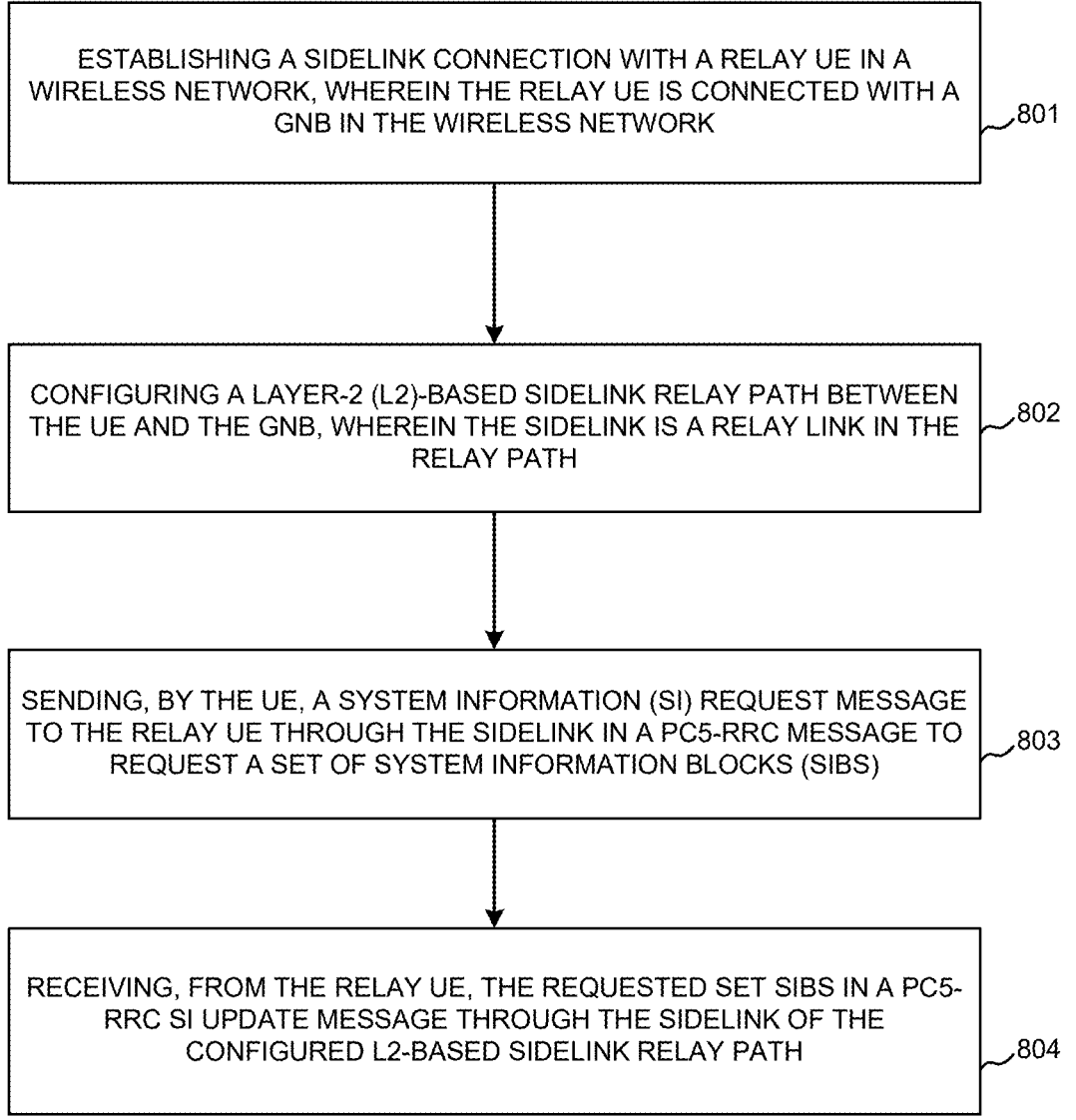

ESTABLISHING A SIDELINK CONNECTION WITH A RELAY UE IN A WIRELESS NETWORK, WHEREIN THE RELAY UE IS CONNECTED WITH A GNB IN THE WIRELESS NETWORK ⌐801

CONFIGURING A LAYER-2 (L2)-BASED SIDELINK RELAY PATH BETWEEN THE UE AND THE GNB, WHEREIN THE SIDELINK IS A RELAY LINK IN THE RELAY PATH ⌐802

SENDING, BY THE UE, A SYSTEM INFORMATION (SI) REQUEST MESSAGE TO THE RELAY UE THROUGH THE SIDELINK IN A PC5-RRC MESSAGE TO REQUEST A SET OF SYSTEM INFORMATION BLOCKS (SIBS) ⌐803

RECEIVING, FROM THE RELAY UE, THE REQUESTED SET SIBS IN A PC5-RRC SI UPDATE MESSAGE THROUGH THE SIDELINK OF THE CONFIGURED L2-BASED SIDELINK RELAY PATH ⌐804

FIG. 8

SYSTEM INFORMATION DELIVERY FOR LAYER-2-BASED SIDELINK RELAY

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2020/141410, titled "Methods and Apparatus of System Information delivery for Sidelink Relay," with an international filing date of Dec. 30, 2020. International Application NO. PCT/CN2020/141410, in turn, claims priority under 35 U.S.C. § 120 and § 365(c) from International Application No. PCT/CN2019/129792, titled "Methods and Apparatus of System Information delivery for Sidelink Relay," with an international filing date of Dec. 30, 2019. International Application No. PCT/CN2020/141410 is pending as of the filing date of this application, and the United States is an elected state in International Application No. PCT/CN2020/141410. International Application No. PCT/CN2019/129792 is pending as of the filing date of this application, and the United States is an elected state in International Application No. PCT/CN2019/129792. The disclosure of each of the foregoing documents is incorporated herein by reference.

FIELD OF THE INVENTION

The disclosed embodiments relate generally to wireless communication, and, more particularly, to system information delivery for layer-2 (L2)-based sidelink relay.

BACKGROUND OF THE INVENTION 5G radio access technology will be a key component of the modern access network. It will address high traffic growth and increasing demand for high-bandwidth connectivity. Wireless relay in cellular networks provides extended coverage and improved transmission reliability. Long term evolution (LTE) network introduced 3GPP sidelink, the direct communication between two user equipment (UEs) without signal relay through a base station. In 3GPP New Radio (NR), sidelink continues evolving. With new functionalities supported, the sidelink offers low latency, high reliability and high throughout for device to device communications. Using sidelink for wireless relay provides a reliable and efficient way for traffic forwarding. System information (SI) includes essential system information blocks (SIBs), also called the minimum SI (MSI) and other SIs (OSI). The SI needs to be delivered to the remote UE from the network. Some SIBs are updated periodically, and some SIBs are delivered on-demand. The on-demand SI are transmitted when the UE requests the SIB. When a remote UE is configured L2-based sidelink relay, the on-demand SI delivery through the sidelink relay path is sought.

Improvements and enhancements are required to achieve deliver on-demand SI for the NR remote UE through the L2-based sidelink relay path.

SUMMARY OF THE INVENTION

Apparatus and methods are provided for system information delivery through a sidelink relay in a NR network. In one novel aspect, on-demand system information is delivered to a remote UE through a sidelink relay path. In one embodiment, the relay UE establishes a sidelink connection with a remote UE, configures a L2-based sidelink relay path between the remote UE and a gNB wherein the sidelink is a relay link in the relay path, sends a SI Request destined to the gNB to request a set of SIBs for the remote UE and sends the requested set of SIBs in a PC5-RRC SI Update message through the sidelink of the configured L2-based sidelink relay path to the remote UE. In one embodiment, the relay UE aggregates SI requests from one or more other additional UEs in the SI Request destined to the gNB. In one embodiment, the PC5-RRC SI Update message is a PC5 unicast message. The PC5 unicast RRC message is based on an Uu-RRC broadcast SI Update message from the gNB in response to the SI Request message from the remote UE and a subsequent PC5-RRC SI Request message indicating a set of SIBs requested from the remote UE. In another embodiment, the PC5-RRC SI Update message is a PC5 broadcast message. The PC5 broadcast message includes a version number in a MAC header indicating a format of a MAC packet data unit (PDU) as SI update broadcast. In yet another embodiment, the PC5-RRC SI Update message is a PC5 groupcast message. The PC5 broadcast message includes a version number in a MAC header indicating a format of a MAC packet data unit (PDU) as SI update broadcast. In one embodiment, remote UE is identified in the PC5 groupcast message based on the SI Request message received by the relay UE. In another embodiment, the remote UE is identified in the PC5 groupcast message based on a destination identification indicating the remote UE at a MAC header. In yet another embodiment, the remote UE is identified in the PC5 groupcast message based on a destination identification indicating the remote UE at a sidelink control information (SCI).

In one embodiment, the remote UE establishes a sidelink connection with a relay UE in a wireless network, wherein the relay UE is connected with a gNB in the wireless network, configures a L2-based sidelink relay path between the UE and the gNB, wherein the sidelink is a relay link in the relay path, sends an SI Request message to the relay UE through the sidelink in a PC5-RRC message to request a set of SIBs, and receives the requested set of SIBs in a PC5-RRC SI Update message through the sidelink of the configured L2-based sidelink relay path. In one embodiment, the remote UE is in an RRC-IDLE state, and wherein the UE sends the SI Request message destined to the gNB through the sidelink in a PC5-RRC SI Request message. In another embodiment, the remote UE is in an RRC-CONNECTED state, and wherein prior to the sending of the SI Request to the relay UE, the UE sends a Uu-RRC SI Request message destined to the gNB through an Uu interface to the gNB, and wherein the UE subsequently receives a subset the requested set of SIBs.

This summary does not purport to define the invention. The invention is defined by the claims.

BRIEF DESCRIPTION OF THE DRAWINGS

The accompanying drawings, where like numerals indicate like components, illustrate embodiments of the invention.

FIG. 8 illustrates an exemplary flow chart for a remote UE to perform system information delivery through a sidelink relay in accordance with embodiments of the current invention.

DETAILED DESCRIPTION

Reference will now be made in detail to some embodiments of the invention, examples of which are illustrated in the accompanying drawings.

Figure 1:
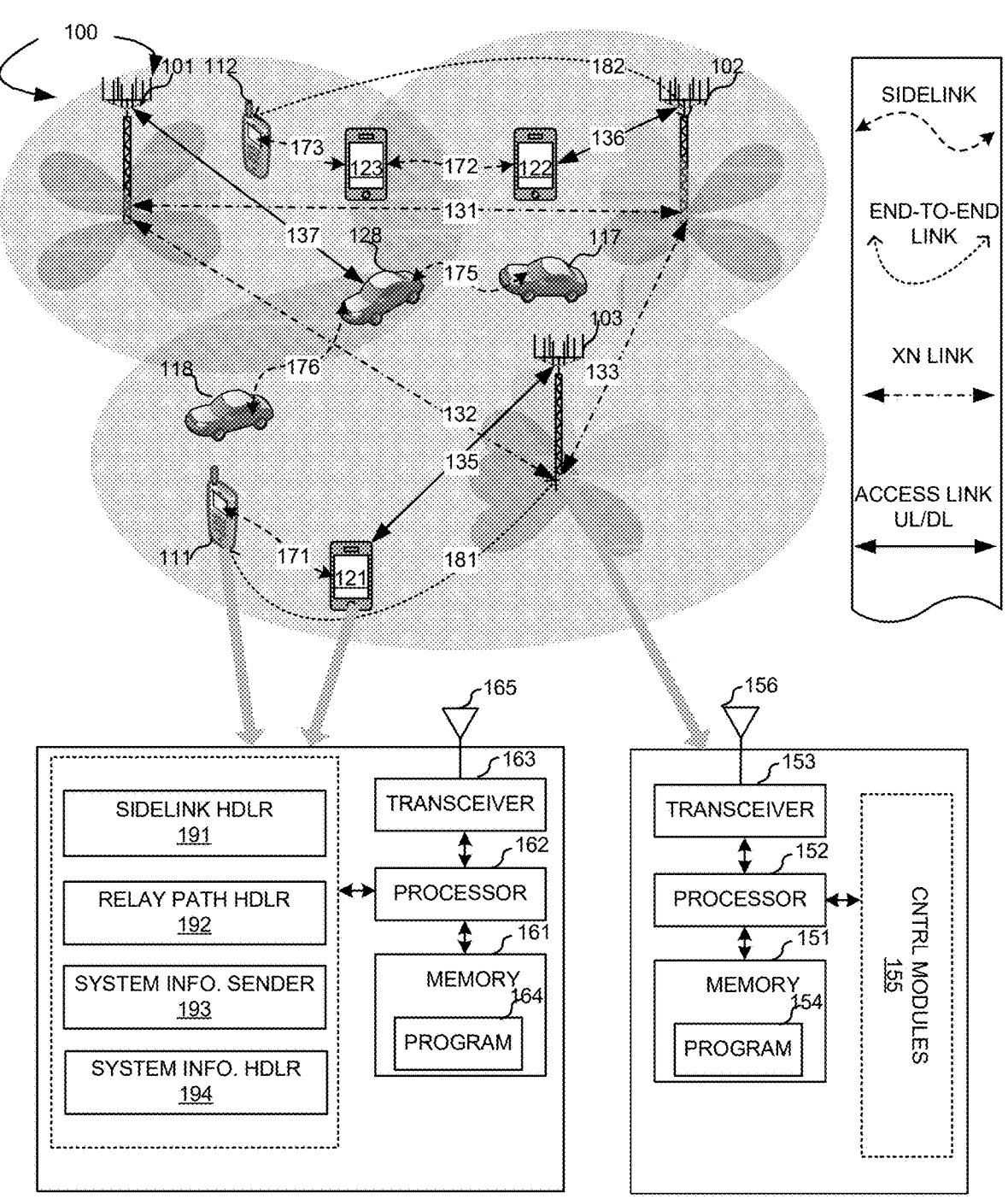
FIG. 1 is a schematic system diagram illustrating an exemplary wireless network for system information delivery through L2-based sidelink relay and in accordance with embodiments of the current invention.

FIG. 1 is a schematic system diagram illustrating an exemplary wireless network for system information delivery through L2-based sidelink relay and in accordance with embodiments of the current invention. Wireless system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. The network can be homogeneous network or heterogeneous network, which can be deployed with the same frequency or different frequency. gNB 101, gNB 102 and gNB 103 are base stations in the NR network, the serving area of which may or may not overlap with each other. Backhaul connections such as 131, 132, and 133, connect the non-co-located receiving base units, such as gNB 101, 102 and 103. These backhaul connections can be either ideal or non-ideal. gNB 101 is connected with gNB 102 via Xnr interface 131 and is connected with gNB 103 via Xnr interface 132. gNB 102 is connected with gNB 103 via Xnr interface 133.

Wireless network 100 also includes multiple communication devices or mobile stations, such user equipments (UEs) such as UEs 111, 112, 113, 117, 118, 121, 122, 123, and 128. Communication devices or mobile stations in wireless network 100 may also refers to devices with wireless connectivity in a vehicle, such as mobile devices 118, 117 and 128. The exemplary mobile devices in wireless network 100 have sidelink capabilities. The mobile devices can establish one or more connections with one or more base stations, such as gNB 101, 102, and 103. The mobile device may also be out of connection with the base stations with its access links but can transmit and receive data packets with another one or more other mobile stations or with one or more base stations through L2-based sidelink relay.

In one novel aspect, on-demand system information is sent to the remote UE through a configured L2-based sidelink relay. In one embodiment, the sidelink relay for the on-demand SI is the L2-based UE-to-Network one-hop relay using sidelink. A remote UE 111 and gNB 103 forms an end-to-end path 181 through a L2-based sidelink relay with a relay UE 121. End-to-end path 181 includes an access link 135 between gNB 103 and relay UE 121 and a sidelink 171 between remote UE 111 and relay UE 121. In another embodiment, the sidelink relay for the on-demand SI is the L2-based UE-to-Network multi-hop relay using sidelink. A remote UE 112 and gNB 102 forms an end-to-end path 182 through a L2-based sidelink relay with a relay UE 122 and another relay UE 123. End-to-end path 182 includes an access link 136 between gNB 102 and relay UE 122, sidelink 172 between relay UE 122 and relay UE 123, and sidelink 173 between remote UE 112 and relay UE 123. In yet another embodiment, a relay mobile device is configured with multiple remote mobile devices or multiple end node mobile devices. A relay UE 128, with an access link 137 to gNB 101 is configured with two remote UEs 117 and 118 through sidelink 175 and 176, respectively. In other embodiments, a relay mobile device can be configured for multiple UE-to-UE relay paths. Different links are established for the illustrated relay paths. An access link is a link between a base station, such as gNB and a mobile device, such as a UE. The UE can be a remote UE or a relay UE. The access link includes both the uplink (UL) and the downlink (DL) between the base station and the mobile device. The interface for the access link is an NR Uu interface. In one embodiment, the remote UE also establishes access link with a base station. A side link is a link between two mobile devices and uses PC5 interface. The sidelink can be a link between a remote UE/end-node UE and a relay UE or a link between two relay mobile devices/UEs for the multi-hop relay. The end-to-end link for a relay path can be a link between two end-node mobile devices for a UE-to-UE relay or a base station to mobile device for a UE-to-Network relay. An Xn link is the backhaul link between two base stations, such gNBs using the Xn interface. In one embodiment, candidate relay UE information is transmitted to the base station via the Xn link.

FIG. 1 further illustrates simplified block diagrams of a base station and a mobile device/UE for adaptation handling for L2-based sidelink relay. gNB 103 has an antenna 156, which transmits and receives radio signals. An RF transceiver circuit 153, coupled with the antenna, receives RF signals from antenna 156, converts them to baseband signals, and sends them to processor 152. RF transceiver 153 also converts received baseband signals from processor 152, converts them to RF signals, and sends out to antenna 156. Processor 152 processes the received baseband signals and invokes different functional modules to perform features in gNB 103. Memory 151 stores program instructions and data 154 to control the operations of gNB 103. gNB 103 also includes a set of control modules 155 that carry out functional tasks to communicate with mobile stations.

A UE can be a remote UE, such as UE 111, or a relay UE, such as UE 121. THE UE has an antenna 165, which transmits and receives radio signals. An RF transceiver circuit 163, coupled with the antenna, receives RF signals from antenna 165, converts them to baseband signals, and sends them to processor 162. In one embodiment, the RF transceiver may comprise two RF modules (not shown). A first RF module is used for HF transmitting and receiving, and the other RF module is used for different frequency bands transmitting and receiving which is different from the HF transceiver. RF transceiver 163 also converts received baseband signals from processor 162, converts them to RF signals, and sends out to antenna 165. Processor 162 processes the received baseband signals and invokes different functional modules to perform features in the UE. Memory 161 stores program instructions and data 164 to control the operations of the UE. Antenna 165 sends uplink transmission and receives downlink transmissions to/from antenna 156 of gNB 103.

The UE also includes a set of control modules that carry out functional tasks. These control modules can be implemented by circuits, software, firmware, or a combination of them. An adaptation manager 191 configures a sidelink adaptation protocol (SAP) layer, wherein the SAP layer is a protocol layer between a radio link control (RLC) layer and a packet data convergence protocol (PDCP) layer, and wherein the UE is configured with at least one sidelink. A relay path manager 192 receives a configuration for a layer-2 (L2)-based sidelink relay path, wherein the L2-based relay path includes one or more relay nodes, a source node and a destination node, and wherein at least one sidelink of the UE is configured in the L2-based relay path. A SAP packet handler 193 performs data packet segmentation or concatenation for relay path data packets on one or more sidelink of the UE at the SAP layer when the UE is configured as the source node or a relay node. A SAP header handler 194 inserts a SAP header at the SAP layer into the segmented or concatenated relay path data packets when the UE is configured as the source node or a relay node wherein the SAP header comprises an adaptation layer address (ALA). A data router 395 routs data packets between the source node and the destination node based on the configured L2-based sidelink relay path.

Figures 2, 3:
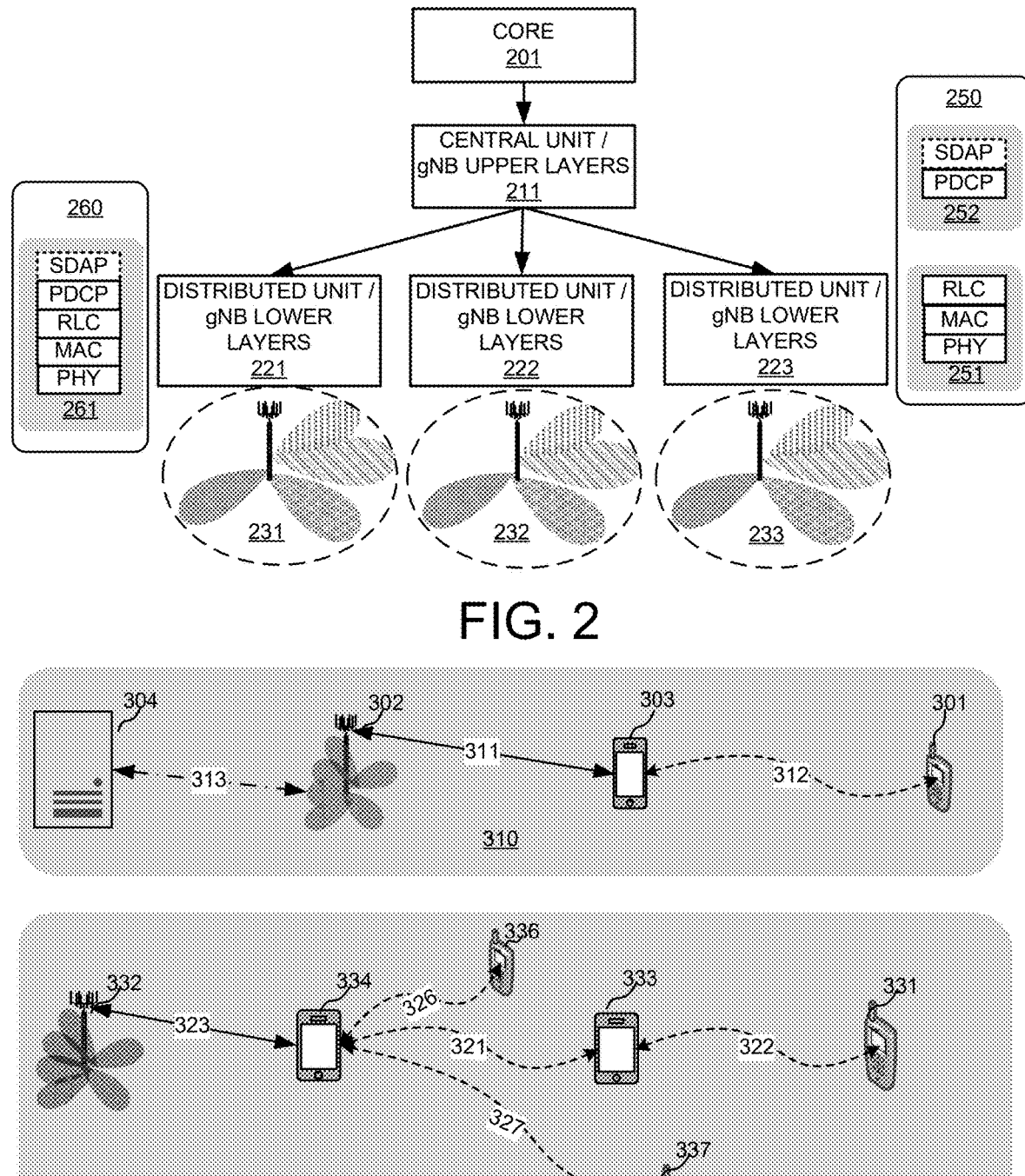
FIG. 2 illustrates an exemplary NR wireless system with centralized upper layers of the NR radio interface stacks in accordance with embodiments of the current invention.
FIG. 3 illustrates exemplary diagrams NR wireless network with an integration of relay UE between the base station and the remote UE to deliver on-demand SI update in accordance with embodiments of the current invention.

FIG. 2 illustrates an exemplary NR wireless system with centralized upper layers of the NR radio interface stacks in accordance with embodiments of the current invention. Different protocol split options between central unit (CU) and distributed unit (DU) of gNB nodes may be possible. The functional split between the CU and DU of gNB nodes may depend on the transport layer. Low performance transport between the CU and DU of gNB nodes can enable the higher protocol layers of the NR radio stacks to be supported in the CU, since the higher protocol layers have lower performance requirements on the transport layer in terms of bandwidth, delay, synchronization and jitter. In one embodiment, SDAP and PDCP layer are located in the CU, while RLC, MAC and PHY layers are located in the DU. A core unit 201 is connected with one central unit 211 with gNB upper layer 252. In one embodiment 250, gNB upper layer 252 includes the PDCP layer and optionally the SDAP layer. Central unit 211 is connected with distributed units 221, 222, and 221. Distributed units 221, 222, and 223 each corresponds to a cell 231, 232, and 233, respectively. The DUs, such as 221, 222 and 223 includes gNB lower layers 251. In one embodiment, gNB lower layers 251 include the PHY, MAC and the RLC layers. In another embodiment 260, each gNB has the protocol stacks 261 including SDAP, PDCP, RLC, MAC and PHY layers.

In one embodiment, the on-demand SI update is delivered to a remote UE through a UE-to-Network sidelink relay path. The UE-to-Network sidelink relay is L2-based and can be configured to be one-hop relay or multi-hop relay. Further, a relay UE may be configured to forward on-demand SI update to multiple remote UEs.

FIG. 3 illustrates exemplary diagrams NR wireless network with an integration of relay UE between the base station and the remote UE to deliver on-demand SI update in accordance with embodiments of the current invention. Diagram 310 illustrates a one-hop UE-to-Network relay for on-demand SI delivery. A remote UE 301 established a relay path with a gNB 302 through a relay UE 303. Relay UE 303 communicates with gNB 302 via access link 313. Relay UE 303 communicates with remote UE 301 through sidelink 312. The sidelink is 3GPP specified radio link that enables V2X applications. gNB 302 transmits data packets destined to remote UE 301 through DL to relay UE 303 and receives data packets from remote UE 301 through UL from relay UE 303. The data path between remote UE 301 and gNB 302 includes access link 311 and sidelink 312. In a NR network, gNB 302 is connected with network entity 304 via S1 link 313. In on embodiment, while remote UE 301 is in the RRC-IDLE state, the relay UE 303 relays the SI Request to gNB 302 for remote UE 301. In another embodiment, while remote UE 301 is in the RRC-CONNECTED state, remote UE 301 has an access link, including uplink (UL) and downlink (DL) with gNB 302 in addition to the sidelink 312 established with relay UE 303.

In other embodiments, illustrated in diagram 320, the on-demand SI update is delivered through a multi-hop UE-to-Network relay. A remote UE 331 established a data path with a gNB 332 through relay UEs 333 and 334. Relay UE 333 communicates with gNB 332 via access link 323. Relay UE 333 communicates with relay UE 334 through sidelink 321. Relay UE 334 communicates with remote UE 331 through sidelink 322. gNB 332 transmits data packets destined to remote UE 331 through DL to relay UEs 334, which is forwarded to relay UE 333 through sidelink 321. gNB 332 receives data packets from remote UE 331 through UL from relay UE 334, which is forwarded from relay 333 through sidelink 322. The relay path between remote UE 331 and gNB 332 includes access link 323 and sidelink 321 and 322. Multi-hop relay can be configured with two or more relay UEs. In one embodiment, the one or more relay UEs and the remote UE/end-node UE are connected with base stations. In another embodiment, the remote UE may be out of range and is not connected with any base station. In yet other embodiments, the one or more relay UEs and the remote UE may be connected with different gNBs. In other multi-hop relay configurations, the combination of connection status of the relay UEs and the end-node UEs are possible as described above. Diagram 320 also illustrates a relay UE is configured with multiple remote UEs and delivers on-demand SI to each remote UE based on predefined rules. Relay UE 334 connects with remote UE 336 via sidelink 326. Relay UE 334 connects with remote UE 337 with sidelink 327. In one embodiment, the relay UE, such as UE 334, aggregates multiple SIBx into a single sidelink PC5 broadcast or group cast. Relay UE 334 groups SIBx for multiple remote UEs, such as UE 331, 336 and 337 in a PC5-RRC broadcast or groupcast/multicast message.

Figure 4:
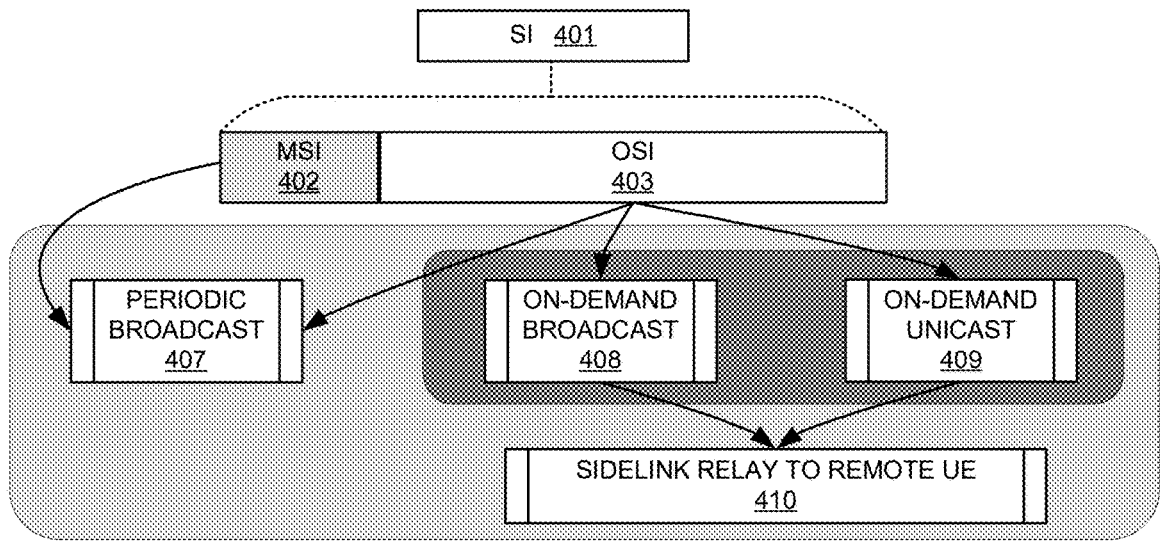
FIG. 4 illustrates an exemplary diagram of system information and SIBs delivered through sidelink relay in accordance with embodiments of the current invention.

FIG. 4 illustrates an exemplary diagram of system information and SIBs delivered through sidelink relay in accordance with embodiments of the current invention. SI 401 includes an MSI 402 and one or more OSI 403. There are three types of SI delivery method, the periodic broadcast 407, on-demand broadcast 408 and on-demand unicast 409. Some of on-demand SIBs are configured to be delivered using periodic broadcast, some of the on-demand SIBs are configured to be delivered using on-demand broadcast, and some of the OSI are configured to be delivered using on-demand unicast. In one novel aspect, at step 410, on-demand broadcast 408 and on-demand unicast 409 are delivered to the remote UE through sidelink relay with a relay UE. The NR network are configured with multiple SIBs. SIB1 is normally defined as the cell-specific SIB. SIBx is used to express a particular SIB message by 3GPP. SIBx also represents multiple SIB messages in some embodiments of the current invention.

Figure 5:
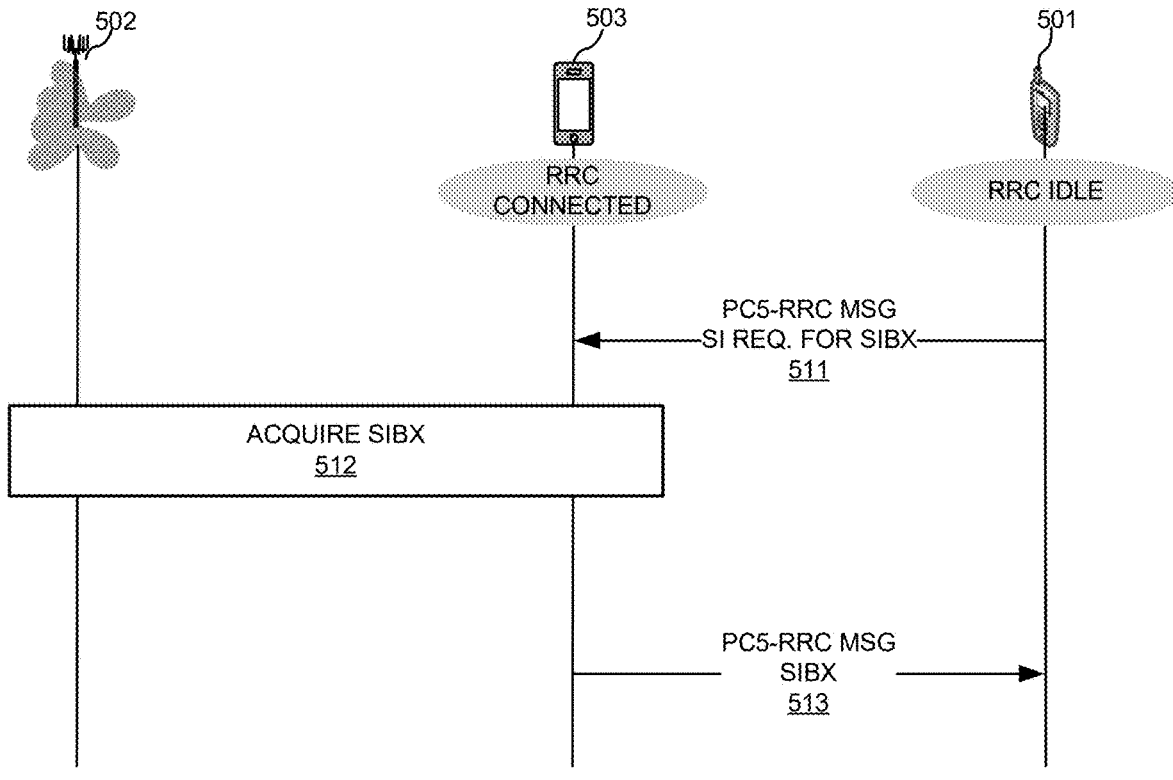
FIG. 5 illustrates exemplary diagrams for on-demand SI update through a sidelink relay path for a remote UE in an RRC-IDLE state in accordance with embodiments of the current invention.

FIG. 5 illustrates exemplary diagrams for on-demand SI update through a sidelink relay path for a remote UE in an RRC-IDLE state in accordance with embodiments of the current invention. In one novel aspect, a PC5-RRC message is used for the RRC-IDLE state remote UE to send an SI Request to the network through the sidelink relay path. A remote UE 501 is in RRC-IDLE state. A relay path is configured for remote UE 501 and a gNB 502 through a relay UE 503. Relay UE 503 is in RRC-CONNECTED state and is connected with gNB 502. When the remote UE 501 needs to request one or more on-demand SIBs (for example, SIBx), at step 511, remote UE 501 sends the SI Request to the relay UE 503 in a PC5-RRC message. With the sidelink relay configured, the paging and system information are forward between relay UE 503 and remote 501. Remote UE 501 sends the SI request to relay UE 503 to request one particular SIB or a plural of SIBs. In one embodiment, SI request from remote UE 501 is MSG1-based. In another embodiment, the SI request from remote UE 501 is MSG3-based. In one embodiment, a new PC5-RRC message is created. The SI request from remote UE 501 is a pure PC5-RRC message. In another embodiment, remote UE 501 sends the MSG1-based on-demand SI request as in a RACH procedure. Relay UE 503 translates received MSG1-based or MSG3-based SI request from remote UE 501 into a Uu-RRC message. Relay UE 503 sends the Uu-RRC message to gNB 502. In another embodiment, remote UE sends a pure PC5-RRC message based on-demand SI request to relay UE 503. Relay UE 503 translates it into a Uu-RRC message as in an SI Request to the gNB 502.

In one embodiment, relay UE 503 aggregates multiple SI Request from multiple remote UEs. Relay UE 503 forwards the SI requests to gNB 502 or aggregates the SI requests in a single message and sends to the gNB 502. At step 512, relay UE acquires the requested one or more SIBs from one or more remote UEs from gNB 502 using the SI update procedure. At step 513, relay UE 503 sends the requested one or more SIBs to remote UE 501 through PC5-RRC message. In one embodiment, relay UE 503 delivers the SIBs in unicast manner and sends requested SIBs to remote UE 501 through PC5-RRC message. In another embodiment, relay UE 503 delivers the SIBs in broadcast manner and broadcasts the request SIBs to all the potential remote UEs through PC5-RRC message. When it is in broadcast manner, the specific version number indicating the format of this MAC PDU is used. The broadcast transmission is to avoid sending multiple unicast copies to different remote UEs for the same SIBs. In another embodiment, the relay UE 503 delivers the SIBs in groupcast manner and groupcasts the request SIBs to all potential remote UEs requesting the SIBs via PC5-RRC groupcast message. When it is in groupcast manner, the specific version number indicating the format of this MAC PDU is used. This PC5 groupcast message can be identified via specific destination ID (for example, a specific groupcast destination address or the relay service code) at MAC header (e.g. 8 MSB bits of the ID) during sidelink transmission. Part of the address information (e.g. sixteen LSB bits) can be put into the SCI for physical layer filtering. The PC5-RRC message carrying the one or more SIBs includes a container to hold the one or more SIBs organized by the gNB. If multiple SIBs are requested by the remote UEs, there may be multiple containers. The groupcast transmission is to avoid sending multiple unicast copy to different remote UEs for the same SIB. In yet another embodiment, the relay UE delays responding to an SI request from a Remote UE to see if there are additional requests in come. Taking the example of V2X platooning application, the header node, such as relay UE 503, delays the unicast response to the first SI request from one of his member nodes, such as remote UE 501. Relay UE 503 waits for more SI request coming from other connected remote UEs and aims to send a single groupcast message to respond the multiple SI request from different remote UEs. Alternatively, the relay UE responds to the first unicast SI request from one remote UE via a groupcast or broadcast message.

Figure 6:
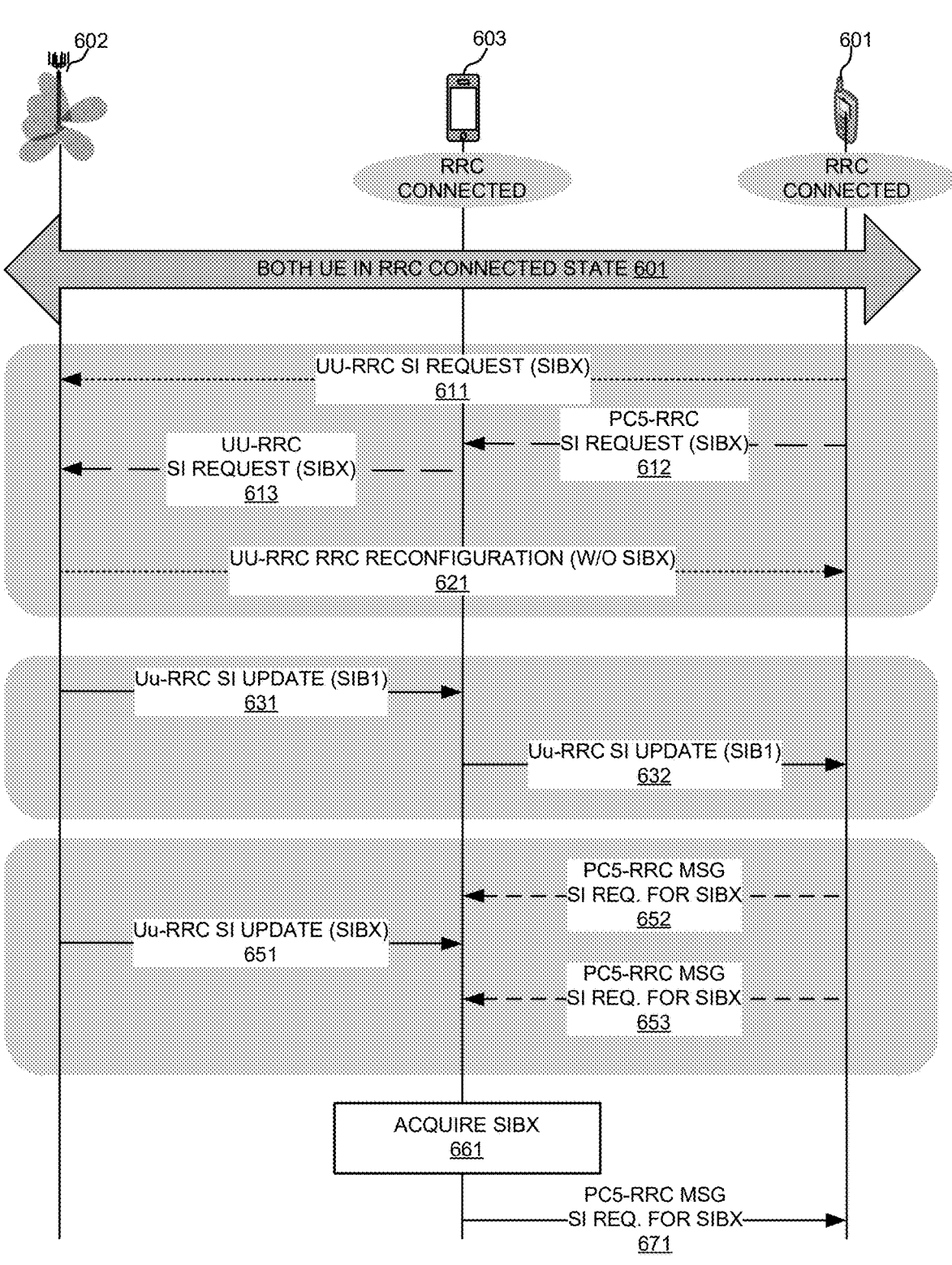
FIG. 6 illustrates exemplary diagrams for on-demand SI update through a sidelink relay path for a remote UE in an RRC-CONNECTED state in accordance with embodiments of the current invention.

FIG. 6 illustrates exemplary diagrams for on-demand SI update through a sidelink relay path for a remote UE in an RRC-CONNECTED state in accordance with embodiments of the current invention. A remote UE 601 and a relay UE 603 are both connected with a gNB 602. Remote UE 601 and relay UE 603, at step 601, are both in RRC-CONNECTED state. Remote UE 601 established a sidelink connection with relay UE 603. At step 611, remote UE 601 sends SI (for example, SIBx) Request to gNB 602 through Uu-RRC message. Relay UE 603 performs L2 forwarding. At step 621, gNB 602 sends SI update to remote UE 601 through Uu-RRC message, such as the RRC Reconfiguration message. In another embodiment, the RRC-CONNECTED state remote UE 601 sends a PC5-RRC message to relay UE 603 at step 612. The PC5-RRC message is a SI Request message destined to gNB 602. Relay UE 603, at step 613, reads the PC5 RRC message and sends a Uu-RRC message, SI request to gNB 602.

Upon receiving the SI Request originated from remote UE 601 in RRC-CONNECTED state, gNB 602 sends SI update for the SIBs requested. In one embodiment, gNB 602 responds with a dedicated RRC signaling, such as an RRC Reconfiguration message, in unicast manner. In one embodiment, gNB 602 does not include any requested SIB in the RRC Reconfiguration message. The unicast response from gNB 602 is an explicit response to indicate to the remote UE 601 the reception of the SI Request. In another embodiment, gNB 602 puts a subset of the requested SIBs in the RRC Reconfiguration message, such as only SIB1 is included the RRC Reconfiguration message at step 631 and at step 651, gNB 602 updates the rest SIBx in Uu-broadcast RRC message. The Uu-broadcast RRC message is an implicit response to the SI Request.

In one embodiment, at step 621, gNB 602 responds with a RRC unicast message. The RRC unicast message is transparent to relay UE 603 and directly relayed to remote UE 601. Upon receiving the RRC unicast response, determines one or more SIBs as not being updated in the response. Remote UE 601, at step 652, sends an SI Request with the set of SIBs requested in a PC5-RRC SI Request to relay UE 603. gNB 602 sends a Uu-RRC SI Update with SIBx at step 651. Relay UE 603, working at L2, does not decode the contents and has no information of the destination of the Uu-RRC SI Update. In one embodiment, remote UE 601, at step 653 sends an SI Request with the set of SIBs requested in a PC5-RRC SI Request to relay UE 603. Step 652 and step 653 are in alternative form. Remote UE 601 may send the PC5-RRC SI Request to relay UE 603 before or after relay UE 603 receives the Uu-RRC SI Update from gNB 602.

In one embodiment, relay UE 603 receives Uu-RRC SI update with a subset of SIBs, such as in step 631. Relay UE 603 relays the SI Update to remote UE 601. In one embodiment, relay UE 603 relays SI Update to remote UE 601 in unicast manner and sends SIB1 to remote UE through PC5-RRC message as in step 632. In another embodiment, relay UE 603 delivers SIB1 received in step 631 to remote UE 601 in broadcast manner and broadcast SIB1 to all the potential remote UEs via PC5-broadcast RRC message. When in broadcast manner, the specific version number indicating the format of this MAC PDU is used. The broadcast transmission is to avoid sending multiple unicast copy to different remote UEs for SIB1. Relay UE 603 delivers SIB1 in groupcast manner and groupcasts SIB1 to all potential remote UEs or the remote UEs requesting the SIBs via PC5-RRC message. When it is in groupcast manner, the specific Version number indicating the format of this MAC PDU is used. This PC5 groupcast message can be identified via specific destination ID (for example, a specific groupcast destination address or the relay service code) at MAC header (e.g. eight MSB bits of the ID) during sidelink transmission. Part of the address information (e.g. sixteen LSB bits) can be put into the SCI for physical layer filtering. The PC5-RRC message carrying SIB1 includes a container organized by the gNB. The groupcast transmission is to avoid sending multiple unicast copy to different Remote UEs for SIB1.

Upon receiving PC5-RRC SI Request for SIBx from remote UE 601, at step 661, relay UE 603 acquires the SIBx from the network. the Uu-RRC SI update at step 651 includes the requested SIBx. At step 671, relay UE 603 delivers the SIBs to remote UE 601 through PC5-RRC message. In one embodiment, relay UE 603 delivers the SIBs to remote UE 601 through unicast message. In another embodiment, the relay UE delivers the SIBs in broadcast manner and broadcasts the request SIBs to all the potential remote UEs via PC5-RRC message. When it is in broadcast manner, the specific version number indicating the format of this MAC PDU is used. The broadcast transmission is to avoid sending multiple unicast copy to different remote UEs for the same SIB. In yet another embodiment, the relay UE delivers the SIB(s) in groupcast manner and groupcast the request SIB(s) to all potential remote UEs or the remote UEs requesting the SIBs via PC5 RRC message. When it is in groupcast manner, the specific version number indicating the format of this MAC PDU is used. This PC5 groupcast message can be identified via specific destination ID (for example, a specific groupcast destination address or the relay service code) at MAC header (e.g. eight MSB bits of the ID) during Sidelink transmission. Part of the address information (e.g. sixteen LSB bits) can be put into the SCI for physical layer filtering. The PC5-RRC message carrying the SIBs includes a container to hold the SIBs organized by the gNB. If multiple SIBs are requested by the Remote UEs, there may be multiple containers. The groupcast transmission is to avoid sending multiple unicast copy to different Remote UEs for the same SIB.

Figure 7:
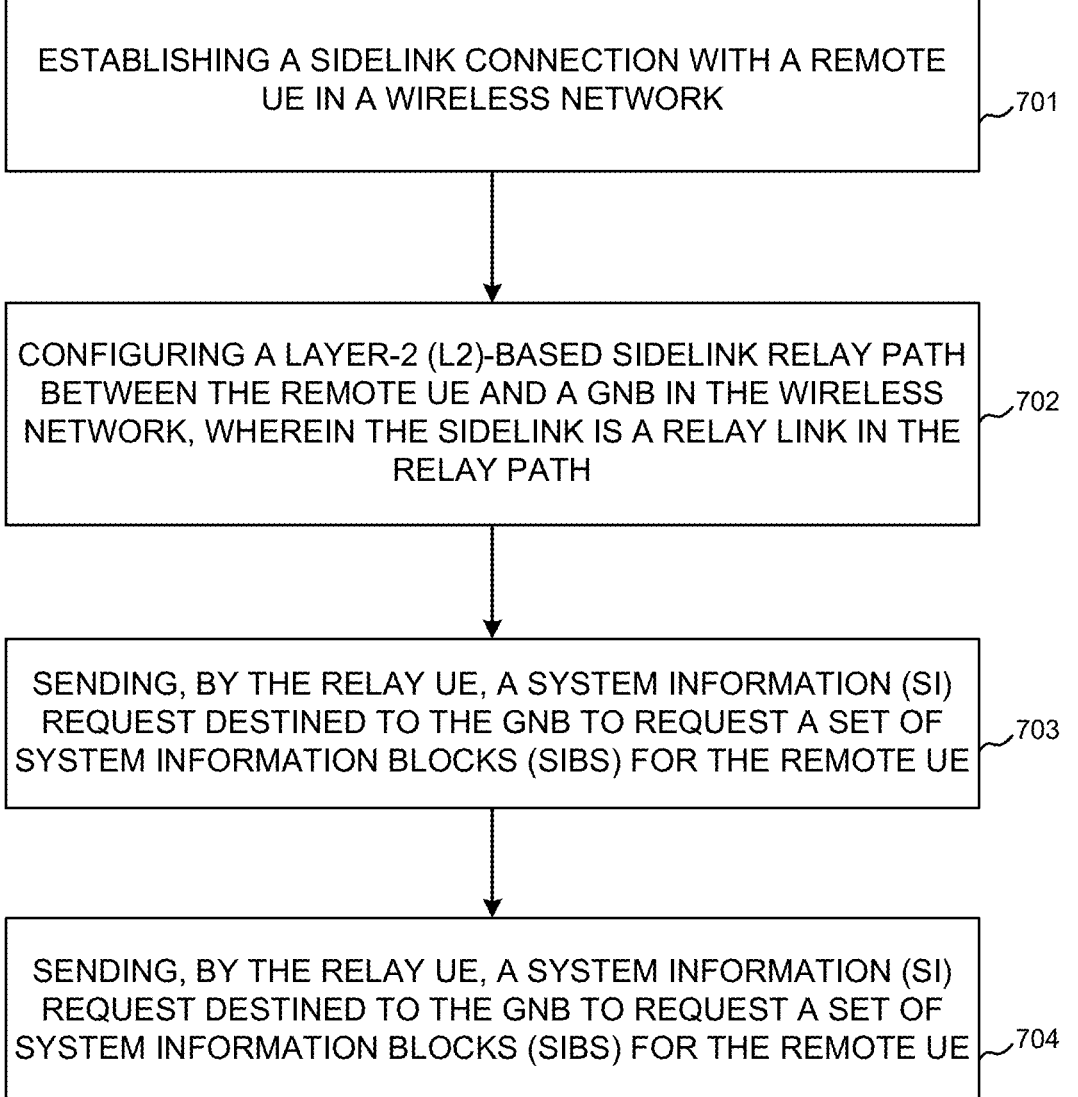
FIG. 7 illustrates an exemplary flow chart for a relay UE to perform system information delivery through a sidelink relay in accordance with embodiments of the current invention.

FIG. 7 illustrates an exemplary flow chart for a relay UE to perform system information delivery through a sidelink relay in accordance with embodiments of the current invention. At step 701, the relay UE establishes a sidelink connection with a remote UE in a wireless network. At step 702, the relay UE configures a L2-based sidelink relay path between the remote UE and a gNB in the wireless network, wherein the sidelink is a relay link in the relay path. At step 703, the relay UE sends an SI Request destined to the gNB to request a set of system information blocks (SIBs) for the remote UE. At step 704, the relay UE sends the requested set of SIBs in a PC5-RRC SI Update message through the sidelink of the configured L2-based sidelink relay path to the remote UE.

FIG. 8 illustrates an exemplary flow chart for a remote UE to perform system information delivery through a sidelink relay in accordance with embodiments of the current invention. At step 801, the remote UE establishes a sidelink connection with a relay UE in a wireless network, wherein the relay UE is connected with a gNB in the wireless network. At step 802, the remote UE configures a L2-based sidelink relay path between the UE and the gNB, wherein the sidelink is a relay link in the relay path. At step 803, the remote UE sends an SI Request message to the relay UE through the sidelink in a PC5-RRC message to request a set of SIBs. At step 804, the remote UE receives the requested set of SIBs in a PC5-RRC SI Update message through the sidelink of the configured L2-based sidelink relay path.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method for a relay user equipment (UE) comprising:
establishing a sidelink connection with a remote UE in a wireless network;
configuring a layer-2 (L2)-based sidelink relay path between the remote UE and a gNB in the wireless network, wherein the sidelink is a relay link in the relay path;
sending, by the relay UE, a system information (SI) Request destined to the gNB to request a set of system information blocks (SIBs) for the remote UE; and
sending, by the relay UE, the requested set of SIBs in a PC5-RRC SI Update message through the sidelink of the configured L2-based sidelink relay path to the remote UE, wherein the PC5-RRC SI Update message is a PC5 unicast message, and wherein the PC5 unicast RRC message is based on an Uu-RRC broadcast SI Update message from the qNB in response to the SI Request message from the remote UE and a subsequent PC5-RRC SI Request message indicating a set of SIBs requested from the remote UE.

2. The method of claim 1, wherein the relay UE aggregates SI request from one or more additional UEs in the SI Request destined to the gNB.

3. The method of claim 1, wherein the PC5-RRC SI Update message is a PC5 broadcast message.

4. The method of claim 3, wherein the PC5 broadcast message includes a version number in a MAC header indicating a format of a MAC packet data unit (PDU) as SI update broadcast.

5. The method of claim 1, wherein the PC5-RRC SI Update message is a PC5 groupcast message.

6. The method of claim 5, wherein the PC5 broadcast message includes a version number in a MAC header indicating a format of a MAC packet data unit (PDU) as SI update broadcast.

7. The method of claim 5, wherein the remote UE is identified in the PC5 groupcast message based on the SI Request message received by the relay UE.

8. The method of claim 5, wherein the remote UE is identified in the PC5 groupcast message based on a destination identification indicating the remote UE at a MAC header.

9. The method of claim 5, wherein the remote UE is identified in the PC5 groupcast message based on a destination identification indicating the remote UE at a sidelink control information (SCI).

10. A method for a user equipment (UE) comprising:

establishing a sidelink connection with a relay UE in a wireless network, wherein the relay UE is connected with a gNB in the wireless network;

configuring a layer-2 (L2)-based sidelink relay path between the UE and the gNB, wherein the sidelink is a relay link in the relay path;

sending, by the UE, a system information (SI) Request message to the relay UE through the sidelink in a PC5-radio resource control (RRC) message to request a set of system information blocks (SIBs); and receiving, from the relay UE, the requested set of SIBs in a PC5-RRC SI Update message through the sidelink of the configured L2-based sidelink relay path, wherein the PC5-RRC SI Update message is a PC5 unicast message, and wherein the PC5 unicast RRC message is based on an Uu-RRC broadcast SI Update message from the gNB in response to the SI Request message from the remote UE and a subsequent PC5-RRC SI Request message indicating a set of SIBs requested from the remote UE.

11. The method of claim 10, wherein the UE is in an RRC-CONNECTED state, and the UE sends a Uu-RRC SI Request message destined to the qNB through the sidelink to the relay UE, and wherein the UE subsequently receives a subset the requested set of SIBs.

12. The method of claim 10, wherein the UE is in an RRC-IDLE state, and wherein the UE sends the SI Request message destined to the relay UE through the sidelink in a PC5-RRC SI Request message.

13. A user equipment (UE), comprising:

a transceiver that transmits and receives radio frequency (RF) signal in a wireless network;

a sidelink handler that establishes a sidelink connection with a remote UE in the wireless network;

a relay path handler that configures a layer-2 (L2)-based sidelink relay path between the remote UE and a gNB in the wireless network, wherein the sidelink is a relay link in the relay path;

a system information (SI) sender that sends an SI Request destined to the gNB to request a set of system information blocks (SIBs) for the remote UE; and a SI handler that sends the requested set of SIBs in a PC5-RRC SI Update message through the sidelink of the configured L2-based sidelink relay path to the remote UE, wherein the PC5-RRC SI Update message is a PC5 unicast message, and wherein the PC5 unicast RRC message is based on an Uu-RRC broadcast SI Update message from the gNB in response to the SI Request message from the remote UE and a subsequent PC5-RRC SI Request message indicating a set of SIBs requested from the remote UE.

14. The UE of claim 13, wherein the UE aggregates SI request from one or more additional UEs in the SI Request destined to the gNB.

15. The UE of claim 13, wherein the PC5-RRC SI Update message is a PC5 unicast message, a PC5 broadcast or a PC5 group cast message.

16. The UE of claim 13, wherein PC5-RRC SI Update message is a PC5 unicast message and is based on an Uu-RRC broadcast SI Update message from the gNB in response to the SI Request message from the remote UE and a subsequent PC5-RRC SI Request message indicating a set of SIBs requested from the remote UE.

17. The UE of claim 13, wherein the PC5-RRC SI Update message is a PC5 broadcast message or a PC5 groupcast message that includes a version number in a MAC header indicating a format of a MAC packet data unit (PDU) as SI update broadcast or SI update groupcast, respectively.

18. The UE of claim 13, wherein the PC5-RRC SI Update message is a PC5 groupcast message, and wherein the remote UE is identified in the PC5 groupcast message based on at least one identifiers comprising the SI Request message received by the relay UE, a destination identification indicating the remote UE at a MAC header, and on a destination identification indicating the remote UE at a sidelink control information (SCI).

* * * * *